US009156951B2

(12) United States Patent
Cao et al.

(10) Patent No.: US 9,156,951 B2
(45) Date of Patent: *Oct. 13, 2015

(54) CHEMICAL MODIFICATION OF LIGNIN AND LIGNIN DERIVATIVES

(71) Applicant: Cyclewood Solutions, Inc., Fayetteville, AR (US)

(72) Inventors: Nhiem Cao, Fort Smith, AR (US); Kevin Oden, Irving, TX (US); Wolfgang G. Glasser, Richmond, VA (US)

(73) Assignee: CYCLEWOOD SOLUTIONS, INC., Fayetteville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,180

(22) Filed: Jan. 12, 2015

(65) Prior Publication Data
US 2015/0126686 A1       May 7, 2015

Related U.S. Application Data

(63) Continuation of application No. 13/892,228, filed on May 10, 2013.

(60) Provisional application No. 61/646,149, filed on May 11, 2012.

(51) Int. Cl.
C08L 97/00       (2006.01)
C08H 7/00        (2011.01)
(Continued)

(52) U.S. Cl.
CPC .. C08H 6/00 (2013.01); C07G 1/00 (2013.01); C08G 63/91 (2013.01); C08L 67/02 (2013.01);
(Continued)

(58) Field of Classification Search
CPC ............ C08G 63/91; C07G 1/00; C08H 6/00; C08L 97/005; C08L 67/04; C08L 67/02
USPC .......................................................... 524/72
See application file for complete search history.

(56) References Cited

U.S. PATENT DOCUMENTS

| 4,017,474 A | 4/1977 | Glasser et al. |
| 4,803,255 A | 2/1989 | Pruett et al. |

(Continued)

FOREIGN PATENT DOCUMENTS

| CA | 1097617 | 3/1981 |
| WO | WO95/25846 | 9/1995 |

(Continued)

OTHER PUBLICATIONS

Wu et al. Engineering Plastics from Lignin. I. Synthesis of Hydroxypropyl Lignin. Journal of Applied Polymer Science, vol. 29, 1111-1123 (1984).*

(Continued)

*Primary Examiner* — John Uselding
(74) *Attorney, Agent, or Firm* — Patent Capital Group

(57) ABSTRACT

A method for producing a trans-esterified hydroxypropyl lignin (HPL) is provided in one example embodiment and includes precipitating a lignin, dissolving the precipitated lignin in a solution, adding a reagent to the solution, adjusting the pH of the solution, allowing reactions in the solution to occur for a predetermined amount of time, precipitating the solution to produce a precipitate, and washing, filtering, and drying the precipitate to produce the trans-esterified HPL. In one example, a thermoplastic may be added to produce a trans-esterified HPL/thermoplastic blend.

9 Claims, 20 Drawing Sheets

(51) Int. Cl.
*C07G 1/00* (2011.01)
*C08G 63/91* (2006.01)
*C08L 67/02* (2006.01)
*C08L 67/04* (2006.01)

(52) U.S. Cl.
CPC .............. *C08L 67/04* (2013.01); *C08L 97/005* (2013.01); *C08L 2201/06* (2013.01); *C08L 2203/16* (2013.01); *C08L 2207/04* (2013.01)

(56) References Cited

U.S. PATENT DOCUMENTS

| | | | |
|---|---|---|---|
| 5,512,276 | A | 4/1996 | Lang et al. |
| 5,614,564 | A | 3/1997 | Hwang et al. |
| 5,770,010 | A | 6/1998 | Jelks |
| 6,117,925 | A | 9/2000 | Tomka et al. |
| 6,172,204 | B1 | 1/2001 | Sarkanen et al. |
| 8,809,426 | B2 | 8/2014 | Cao et al. |
| 8,865,802 | B2 | 10/2014 | Cao et al. |
| 9,000,075 | B2 | 4/2015 | Cao et al. |
| 2002/0028857 | A1 | 3/2002 | Holy |
| 2007/0143932 | A1 | 6/2007 | Buchert |
| 2010/0240877 | A1 | 9/2010 | Truslowe |
| 2010/0317070 | A1 | 12/2010 | Agaskar |
| 2011/0071238 | A1 | 3/2011 | Bastioli et al. |
| 2011/0297340 | A1 | 12/2011 | Kouisni et al. |
| 2012/0161060 | A1 | 6/2012 | Homan et al. |
| 2013/0303711 | A1 | 11/2013 | Cao et al. |
| 2014/0121307 | A1 | 5/2014 | Cao et al. |
| 2014/0121360 | A1 | 5/2014 | Cao et al. |
| 2015/0126685 | A1 | 5/2015 | Cao et al. |
| 2015/0126687 | A1 | 5/2015 | Cao et al. |

FOREIGN PATENT DOCUMENTS

| | | |
|---|---|---|
| WO | WO2011/054892 | 5/2011 |
| WO | WO2012/010401 | 1/2012 |
| WO | WO2013/170236 | 11/2013 |
| WO | WO2013/170237 | 11/2013 |
| WO | WO2013/170238 | 11/2013 |
| WO | WO2013/170239 | 11/2013 |
| WO | WO2014/070821 | 5/2014 |
| WO | WO2014/070830 | 5/2014 |

OTHER PUBLICATIONS

USPTO Mar. 10, 2015 Non-Final Office Action from U.S. Appl. No. 14/066,669.
Bentivenga, G., et al., "Degradation of steam-exploded lignin from beech by using Fenton's reagent," Biomass and Bioenergy 24 (Jun. 2003) pp. 233-238.
U.S. Appl. No. 14/595,177, filed Jan. 12, 2015, entitled "Chemical Modification of Lignin and Lignin Derivatives," Inventor(s): Nhiem Cao, et al.
USPTO Feb. 25, 2015 Non-Final Office Action from U.S. Appl. No. 14/595,177.
U.S. Appl. No. 14/595,182, filed Jan. 12, 2015, entitled "Chemical Modification of Lignin and Lignin Derivatives," Inventor(s): Nhiem Cao, et al.
USPTO Feb. 26, 2015 Non-Final Office Action from U.S. Appl. No. 14/595,182.
U.S. Appl. No. 14/660,918, filed Mar. 17, 2015, entitled "Reactive Extrusion Processes," Inventor: Bernard Robert McKellar.
Ciemniecki, et al., "Polymer Blends with Hydroxypropyl Lignin," Chapter 35, ACS Symposium Series, Jul. 31, 1989, pp. 452-463.
Ciemniecki, S. L., et al., "Multiphase Materials with Lignin: 1. Blends of Hydroxypropyl Lignin with Poly(methyl methacrylate)," Polymer, Jun. 1988, vol. 29, pp. 1021-1029; © 1988 Butterworth & Co. (Publishers) Ltd.; 9 pages.
De Oliveira, W., et al., "Multiphase Materials with Lignin. 11. Star-like Copolymers with Caprolactone," Macromolecules 1994, vol. 27, No. 1; © 1994 American Chemical Society; 7 pages.
Doherty, et al., "Value-adding to Cellulosic Ethanol: Lignin Polymers," Industrial Crops and Products 33 (2011) 259-276; Nov. 19, 2010.
Fang, Changing, et al., "Characterization of Polypropylene-polyethylene Blends Made of Waste Materials with Compatibilizer and Non-Filler," Composites: Part B: Engineering, vol. 44, Dec. 2013; pp. 498-505 © 2013 Elsevier Ltd. All Rights Reserved.
Glasser, W.G., et al., "Engineering Plastics from Lignin. 11. Characterization of Hydroxyalkyl Lignin Derivatices," Journal of Applied Polymer Science, 1984, vol. 29; © 1984 John Wiley & Sons, Inc.; 16 pages.
Jain, Rajesh K., et al., "Lignin Derivatives; II. Functional Ethers," Holzforschung, vol. 47, No. 4, 1993; pp. 325-332; © Copyright 1993 by Walter de Gruyter-Berlin-New York.
Li, J., et al., "Thermal and Mechanical Properties of Biodegradable Blends of Poly(L-lactic acid) and Lignin," Polymer International 2003, vol. 52, pp. 949-955; May 12, 2003; 7 pages.
Li, Y., et al., "Alkylated Draft Lignin-Based Thermoplastic Blends with Aliphatic Polyesters," Macromolecules 2002, vol. 35, No. 26, pp. 9707-9715; Nov. 21, 2002.
Liu, Zhao, et al., "Extraction of Lignin from Pulping Black Liquor by Organic Acid," Materials Science Forum, vol. 620-622 (2009) pp. 571-574; © 2009 Trans Tech Publications, Switzerland doi: 10.4028/www.scientific.net/MFG.620-622.571.
Lora, Jairo H., et al., "Recent Industrial Applications of Lignin: A Sustainable Alternative to Nonrenewable Materials," Journal of Polymers and the Environment, vol. 10, No. 1/2—pp. 39-48; © 2002 Plemum Publishing Corporation.
Luo, Feng, et al., "Effects of Compatibilizers on the Mechanical Properties of Low Density Polyethylene/Lignin Blends," Chinese Journal of Polymer Science, Nov. 2009, vol. 27, No. 6, pp. 833-842.
Marais, Andrew, et al., "Toward an Alternative Compatibilizer for PLA/Cellulose Composites: Grafting of Xyloglucan with PLA," Carbohydrate Polymers, vol. 89, Issue 4, Aug. 1, 2012; pp. 1038-1043 © 2012 Elsevier Ltd. All Rights Reserved.
Mariotti, Nicholas, et al., "New Vio-composites Containing Industrial Lignins," Proceedings of the 55th International Convention of Society of Wood Science and Technology, Aug. 27-31, 2012, pp. 1-9.
Pandey, Krishna K., et al.; "Dimensional Stability, UV Resistance, and Static Mechanical Properties of Scots Pine Chemically Modified with Alkylene Epoxides," BioResources, Feb. 10, 2010, vol. 5, No. 2, pp. 598-615.
PCT Feb. 24, 2014 International Search Report with Written Opinion from International Application PCT/US2013/067384; 13 pages.
PCT May 5, 2015 IPRP and Written Opinion of the International Searching Authority from PCT/US2013/067384; 9 pages.
PCT Dec. 12, 2013 International Search Report from International Application PCT/US2013/040682; 4 pages.
PCT—Nov. 11, 2014 IPRP and Written Opinion of the International Searching Authority from PCT/US2013/040682.
PCT Aug. 6, 2013 International Search Report and Written Opinion of the International Searching Authority from Application Serial No. PCT/US2013/040683 10 pages.
PCT—Nov. 11, 2014 IPRP and Written Opinion of the International Searching Authority from PCT/US2013/040683.
PCT Sep. 4, 2013 International Search Report and Written Opinion of the International Searching Authority from Application Serial No. PCT/US2013/040684.
PCT—Nov. 11, 2014 IPRP and Written Opinion of the International Searching Authority from PCT/US2013/040684.
PCT Aug. 6, 2013 International Search Report and Written Opinion of the International Searching Authority from Application Serial No. PCT/US2013/040685 8 pages.
PCT—Nov. 11, 2014 IPRP and Written Opinion of the International Searching Authority from PCT/US2013/040685.
PCT Feb. 5, 2014 International Search Report and Written Opinion from International Application No. PCT/US2013/067401.
PCT May 5, 2015 IPRP and Written Opinion of the International Searching Aurhority from Application No. PCT/US2013/067401; 8 pages.
Poursorkhabi, Vida, et al., "Extraction of Lignin from a Coproduct of the Cellulosic Ethanol Industry and Its Thermal Characterization," BioResources, vol. 8, Issue 4, Nov. 2013; pp. 5083-5101.

(56) References Cited

OTHER PUBLICATIONS

Sahoo, S., et al., "Enhanced Properties of Lignin-Based Biodegradable Polymer Composites Using Injection Moudling Process," Composites: Part A. 201, vol. 42, pp. 1710-1718, Jul. 28, 2011; 9 pages.

Sailaja, R.R.N., et al., "Mechanical and Thermal Properties of Compatibilized Composites of Polyethylene and Esterified Lignin," Materials and Design, vol. 31, Issue 9, Oct. 2010; pp. 4369-4379 © 2010 Elsevier Ltd. All Rights Reserved.

Tomani, Per, "The Lignoboost Process," Cellulose Chemistry and Technology, vol. 44, No. 1-3 (2010); pp. 53-58.

Zhang, Ai-Ping, "Extraction, Purification, and Characterization of Lignin Fractions from Sugarcane Bagasse," BioResources, vol. 8, Issue 2, May 2013; pp. 1604-1614.

Pouteau, et al., "Lignin-Polymer Blends: Evaluation of Compatibility by Image Analysis," C.R. Viologies 327 (Sep. 15, 2004) 935-943.

USPTO Feb. 27, 2014 Non-Final Office Action from U.S. Appl. No. 13/892,227.

USPTO May 7, 2014 Notice of Allowance from U.S. Appl. No. 13/892,227.

USPTO Feb. 28, 2014 Non-Final Office Action from U.S. Appl. No. 13/892,218.

USPTO May 5, 2014 Final Office Action from U.S. Appl. No. 13/892,218.

USPTO Aug. 13, 2014 Notice of Allowance from U.S. Appl. No. 13/892,218.

USPTO Feb. 28, 2014 Notice of Allowance from U.S. Appl. No. 13/892,234.

\* cited by examiner

300

| TIME (MIN) | ADDITION | LIGNIN WT. (LBS) | TOTAL WT. (LBS) | DISPERSER (RPM) | ANCHOR (RPM) | pH | TEMP (°C) |
|---|---|---|---|---|---|---|---|
| 0 | 1 | 22.0 | 22.0 | 0 | 26 | - | - |
| 17 | 2 | 20.4 | 42.4 | 0 | 26 | - | - |
| 31 | 3 | 22.6 | 65.0 | 0 | 26 | - | - |
| 51 | 4 | 22.8 | 87.8 | 418 | 26 | 12.79 | 27.0 |
| 96 | 5 | 22.4 | 110.2 | 418 | 26 | - | - |
| 96 | 6 | 4.8 | 115.0 | 418 | 26 | 12.07 | 26.6 |

| TIME (MIN) | PO (LBS) | TOTAL PO (LBS) | pH | TEMP (°C) | 4N ACID ADDED (L) |
|---|---|---|---|---|---|
| 0 | - | - | 11.47 | 25.5 | - |
| 23 | 8.8 | 8.8 | 11.66 | 23.6 | 0.5 |
| 43 | 6.0 | 14.8 | 11.67 | 27.7 | - |
| 63 | 10.0 | 24.8 | 11.76 | 28.8 | 0.5 |
| 78 | 10.0 | 34.8 | 11.72 | 30.2 | - |
| 93 | 5.6 | 40.4 | 12.20 | 29.0 | 0.5 |
| 108 | 2.7 | 43.1 | 12.45 | 28.2 | 1.0 |

| TIME (MIN) | pH | TEMP (°C) | 4N ACID ADDED (GAL) | CUMULATIVE ACID (GAL) |
|---|---|---|---|---|
| 0 | 12.45 | 28.2 | 1.0 | 1.0 |
| 15 | 12.18 | 35.9 | 0.5 | 1.5 |
| 35 | 12.15 | 36.6 | - | 1.5 |
| 50 | 12.22 | 36.7 | - | 1.5 |
| 60 | 12.24 | 36.5 | 0.5 | 2.0 |
| 92 | 12.24 | 36.8 | 1.0 | 3.0 |
| 145 | 12.14 | 36.5 | - | 3.0 |
| 160 | 12.15 | 35.9 | 0.4 | 3.4 |
| 180 | 12.04 | 35.8 | 0.2 | 3.6 |
| 200 | 12.04 | 34.7 | 0.3 | 3.9 |
| 215 | 11.92 | 34.6 | 0.5 | 4.4 |
| 225 | 11.70 | 34.3 | - | 4.4 |
| 240 | 11.54 | 34.4 | - | 4.4 |
| 865 | 12.14 | 23.0 | - | 4.4 |

| TIME (MIN) | pH | TEMP (°C) | ANCHOR RPM | 36N ACID ADDED (L) | TOTAL ACID (L) |
|---|---|---|---|---|---|
| 0 | 12.14 | 23.0 | 25 | 0.18 | 0.18 |
| 15 | 11.99 | 23.5 | 25 | 0.26 | 0.44 |
| 35 | 11.12 | 24.0 | 25 | 0.33 | 0.77 |
| 55 | 8.01 | 24.9 | 25 | 0.18 | 0.95 |
| 70 | 6.55 | 25.1 | 25 | 0.26 | 1.21 |
| 90 | 5.85 | 25.1 | 25 | 0.33 | 1.54 |
| 107 | 4.46 | 25.6 | 25 | 0.37 | 1.90 |
| 122 | 2.33 | 27.8 | 25 | - | 1.90 |
| 129 | 2.46 | 28.7 | 25 | - | 1.90 |
| 134 | 2.52 | 29.1 | 25 | 0.07 | 1.98 |
| 141 | 2.46 | 29.3 | 25 | - | 1.98 |
| 146 | 2.48 | 29.4 | 25 | - | 1.98 |

| TIME (MIN) | ADDITION NUMBER | LIGNIN WT. (LBS) | TOTAL WT. (LBS) | DISPERSER (RPM) | ANCHOR (RPM) |
|---|---|---|---|---|---|
| 0 | 1 | 15.6 | 15.6 | 0 | 26 |
| 1 | 2 | 15.4 | 31.0 | 0 | 26 |
| 18 | 3 | 11.8 | 42.8 | 0 | 26 |
| 19 | 4 | 13.4 | 56.2 | 418 | 26 |
| 36 | 5 | 7.2 | 63.4 | 418 | 26 |
| 37 | 6 | 13.0 | 76.4 | 418 | 26 |
| 57 | 7 | 16.0 | 92.4 | 418 | 26 |
| 69 | 8 | 6.4 | 98.8 | 418 | 26 |
| 70 | 9 | 4.2 | 103.0 | 418 | 26 |
| 73 | 10 | 7.0 | 110.0 | 418 | 26 |

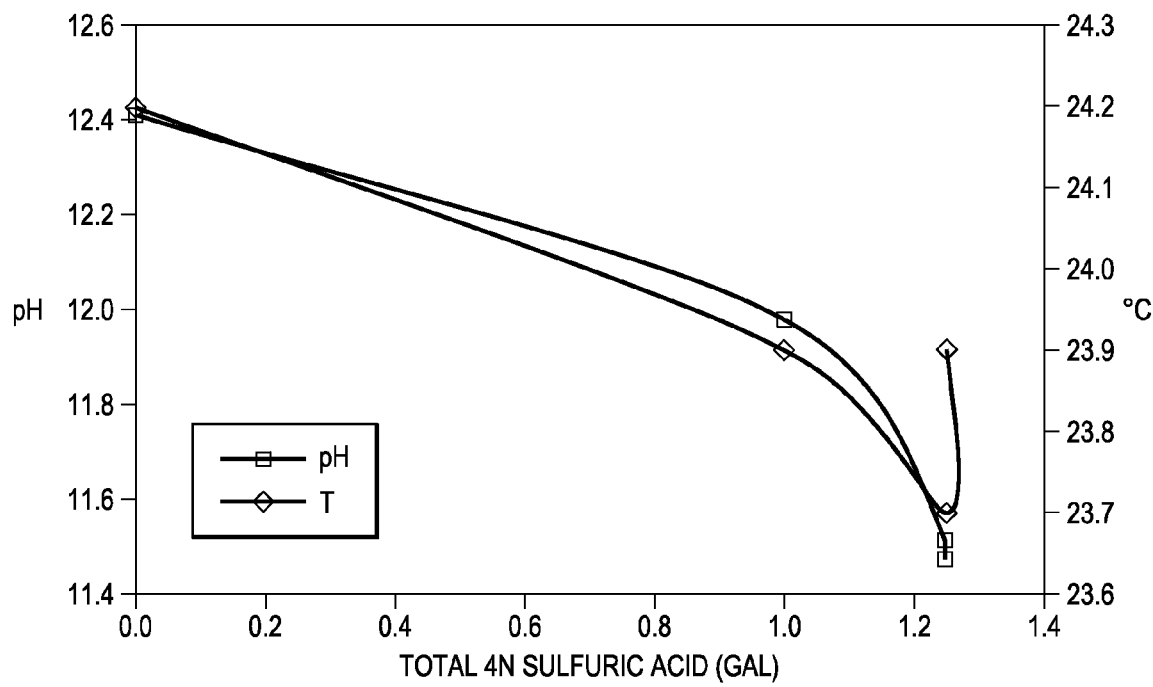

1300

| TIME (MIN) | pH | TEMP (°C) | 4N ACID ADDED (GAL) | ICE ADDED (LBS) |
|---|---|---|---|---|
| 0 | 12.01 | 29.9 | - | - |
| 15 | 12.18 | 30.8 | 0.25 | - |
| 35 | 12.16 | 31.6 | 0.50 | - |
| 55 | 12.12 | 32.7 | 0.25 | - |
| 80 | 12.13 | 33.0 | 0.25 | - |
| 100 | 12.12 | 33.1 | 0.25 | - |
| 122 | 12.12 | 33.2 | 0.25 | 2.6 |
| 143 | 12.13 | 31.9 | 0.25 | 2.6 |
| 165 | 12.11 | 31.0 | 0.25 | 5.8 |
| 185 | 12.10 | 29.7 | - | 7.2 |
| 210 | 12.13 | 27.8 | - | 5.6 |
| 230 | 12.15 | 26.5 | 0.25 | 4.8 |
| 250 | 12.14 | 25.5 | 0.25 | - |
| 265 | 12.11 | 25.6 | - | - |
| 980 | 12.35 | 22.6 | - | - |
| 995 | 12.35 | 22.5 | - | - |
| 1020 | 12.33 | 22.4 | - | - |

| TIME (MIN) | pH | TEMP (°C) | ANCHOR RPM | 36N ACID ADDED (L) | TOTAL ACID (AT pH READING) |
|---|---|---|---|---|---|
| 0 | 12.33 | 22.4 | 25 | 0.59 | 0.00 |
| 30 | 12.16 | 23.9 | 25 | 0.88 | 0.59 |
| 90 | 5.79 | 26.5 | 25 | 0.35 | 1.46 |
| 155 | 5.10 | 25.6 | 25 | 0.29 | 1.82 |
| 180 | 3.34 | 25.8 | 25 | 0.18 | 2.11 |
| 195 | 2.49 | 26.1 | 25 | - | 2.28 |
| 205 | 2.60 | 26.3 | 25 | 0.06 | 2.28 |
| 273 | 2.94 | 26.0 | 25 | 0.18 | 2.34 |
| 295 | 1.98 | 26.7 | 25 | - | 2.52 |

ASTM D412 TENSION TEST
TEST TEMP = ROOM TEMP
TEST SPEED = 2"/MIN

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| CONTROL APL/PE/NO CAT | 1 | 0.500 | 0.0552 | 9.46 | 343 | <5 | NOT INCLUDED IN AVG. SPECIMEN FAILED PREMATURELY AT AN INTERNAL DEFECT |
| | 2 | 0.500 | 0.0545 | 16.42 | 603 | <5 | |
| | 3 | 0.500 | 0.0483 | 14.15 | 586 | <5 | |
| | 4 | 0.500 | 0.0512 | 16.35 | 639 | <5 | |
| | 5 | 0.500 | 0.0538 | 16.40 | 610 | <5 | |
| | | | | AVG. = | 610 | <5 | |
| | | | | STD. DEV. = | 22 | NA | |
| | | | | CoV (%) = | 3.6% | NA | |

FIG. 17

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 200°C/10 MINS. APL/PE/NO CAT | 1 | 0.500 | 0.0542 | 43.25 | 1596 | 5 | |
| | 2 | 0.500 | 0.0557 | 48.01 | 1724 | 10 | |
| | 3 | 0.500 | 0.0577 | 48.57 | 1684 | 10 | |
| | 4 | 0.500 | 0.0580 | 49.13 | 1694 | 5 | |
| | 5 | 0.500 | 0.0587 | 43.43 | 1480 | 5 | |
| | | | | AVG. = | 1636 | 8 | |
| | | | | STD. DEV. = | 99 | 3 | |
| | | | | CoV (%) = | 6.1% | 38.5% | |

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 200°C/30 MINS. APL/PE/NO CAT | 1 | 0.500 | 0.0595 | 43.37 | 1458 | <5 | |
| | 2 | 0.500 | 0.0603 | 45.88 | 1522 | <5 | |
| | 3 | 0.500 | 0.0578 | 39.66 | 1372 | <5 | |
| | 4 | 0.500 | 0.0550 | 41.72 | 1517 | <5 | |
| | 5 | 0.500 | 0.0615 | 44.54 | 1518 | <5 | |
| | | | | AVG. = | 1477 | <5 | |
| | | | | STD. DEV. = | 65 | NA | |
| | | | | CoV (%) = | 4.4% | NA | |

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 200°C/60 MINS. APL/PE/NO CAT | 1 | 0.500 | 0.0575 | 41.53 | 1445 | 15 | |
| | 2 | 0.500 | 0.0577 | 41.11 | 1425 | 5 | |
| | 3 | 0.500 | 0.0592 | 43.71 | 1477 | 10 | |
| | 4 | 0.500 | 0.0587 | 44.11 | 1503 | 10 | |
| | 5 | 0.500 | 0.0567 | 41.39 | 1460 | 10 | |
| | | | | AVG. = | 1462 | 10 | |
| | | | | STD. DEV. = | 30 | 4 | |
| | | | | CoV (%) = | 2.0% | 35.4% | |

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 225°C/10 MINS. APL/PE/NO CAT | 1 | 0.500 | 0.0575 | 35.68 | 1241 | 10 | |
| | 2 | 0.500 | 0.0573 | 35.71 | 1246 | 15 | |
| | 3 | 0.500 | 0.0550 | 35.18 | 1279 | 20 | |
| | 4 | 0.500 | 0.0553 | 33.69 | 1218 | 10 | |
| | 5 | 0.500 | 0.0552 | 35.66 | 1292 | 10 | |
| | | | | AVG. = | 1255 | 13 | |
| | | | | STD. DEV. = | 30 | 4 | |
| | | | | CoV (%) = | 2.4% | 34.4% | |

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 225°C/30 MINS. APL/PE/NO CAT | 1 | 0.500 | 0.0558 | 39.17 | 1404 | 15 | |
| | 2 | 0.500 | 0.0595 | 42.49 | 1428 | 20 | |
| | 3 | 0.500 | 0.0588 | 42.52 | 1446 | 30 | |
| | 4 | 0.500 | 0.0550 | 37.53 | 1365 | 30 | |
| | 5 | 0.500 | 0.0575 | 40.47 | 1408 | 20 | |
| | | | | AVG. = | 1410 | 23 | |
| | | | | STD. DEV. = | 30 | 7 | |
| | | | | CoV (%) = | 2.2% | 29.2% | |

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 225°C/60 MINS. APL/PE/NO CAT | 1 | 0.500 | 0.0587 | 40.69 | 1386 | 25 | |
| | 2 | 0.500 | 0.0560 | 36.20 | 1293 | 20 | |
| | 3 | 0.500 | 0.0577 | 36.70 | 1272 | 20 | |
| | 4 | 0.500 | 0.0557 | 37.17 | 1335 | 35 | |
| | 5 | 0.500 | 0.0583 | 39.66 | 1361 | 25 | |
| | | | | AVG. = | 1329 | 25 | |
| | | | | STD. DEV. = | 47 | 6 | |
| | | | | CoV (%) = | 3.5% | 24.5% | |

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| 250°C/30 MINS. APL/PE/NO CAT | 1 | 0.500 | 0.0543 | 30.30 | 1116 | 10 | |
| | 2 | 0.500 | 0.0545 | 29.79 | 1093 | 10 | |
| | 3 | 0.500 | 0.0537 | 29.58 | 1102 | 10 | |
| | 4 | 0.500 | 0.0532 | 29.05 | 1092 | 10 | |
| | 5 | 0.500 | 0.0545 | 29.11 | 1068 | 10 | |
| | | | | AVG. = | 1094 | 10 | |
| | | | | STD. DEV. = | 18 | 0 | |
| | | | | CoV (%) = | 1.6% | 0.0% | |

ASTM D412 TENSION TEST
TEST TEMP = ROOM TEMP
TEST SPEED = 2"/MIN.

| MATERIAL IDENTIFICATION | SPECIMEN NUMBER | WIDTH (IN.) | THICKNESS (IN.) | MAX LOAD (LBS) | TENSILE STRENGTH (PSI) | TENSILE ELONGATION (%) | COMMENTS |
|---|---|---|---|---|---|---|---|
| CONTROL APL/PE/ZnAc/ Ti(OBo)4 | 1 | 0.500 | 0.0543 | 25.85 | 952 | <5 | |
| | 2 | 0.500 | 0.0553 | 23.52 | 851 | <5 | |
| | 3 | 0.500 | 0.0535 | 28.32 | 1059 | <5 | |
| | 4 | 0.500 | 0.0555 | 25.87 | 932 | <5 | |
| | 5 | 0.500 | 0.0543 | 27.04 | 996 | <5 | |
| | | | | AVG. = | 958 | <5 | |
| | | | | STD. DEV. = | 77 | NA | |
| | | | | CoV (%) = | 8.1% | NA | |

FIG. 25

CHEMICAL MODIFICATION OF LIGNIN AND LIGNIN DERIVATIVES

CROSS-REFERENCE TO RELATED APPLICATION

This application is a continuation and claims the benefit of priority under 35 U.S.C. §119(e) to U.S. patent application Ser. No. 13/892,228 "CHEMICAL MODIFICATION OF LIGNIN AND LIGNIN DERIVATIVES" filed May 10, 2013, and to U.S. Provisional Application Ser. No. 61/646,149, "CHEMICAL MODIFICATION OF LIGNIN AND LIGNIN DERIVATIVES FOR BIODEGRADABLE USE" filed May 11, 2012, which are hereby incorporated by reference in their entirety.

TECHNICAL FIELD

This disclosure relates in general to the field of compositions and, more particularly, to the chemical modification of lignin and lignin derivatives.

BACKGROUND

A plastic material is any of a wide range of synthetic, semi-synthetic, or natural organic solids that may be moldable. Plastics are typically organic polymers of high molecular mass, but they often contain other substances. Early plastics were bio-derived materials such as egg and blood proteins, which are organic polymers. In the 1800s, the development of plastics accelerated with Charles Goodyear's discovery of vulcanization as a route to thermoset materials derived from natural rubber. After the First World War, improvements in chemical technology led to an explosion in new forms of plastics. Among the earliest examples in the wave of new polymers were polystyrene (PS) and polyvinyl chloride (PVC). The development of plastics has come from the use of natural plastic materials (e.g., chewing gum, shellac) to the use of chemically modified natural materials (e.g., rubber, nitrocellulose, collagen, galalite) and finally to completely synthetic molecules (e.g., bakelite, epoxy, PVC). Plastics are durable and degrade slowly because the chemical bonds that make plastic so durable, make it equally resistant to natural processes of degradation. As a result, most plastic we use today will either be incinerated or end up in a landfill for many years.

BRIEF DESCRIPTION OF THE DRAWINGS

FIG. 5 is a simplified table illustrating possible example details associated with the chemical modification of lignin and lignin derivatives;

FIG. 6 is a simplified table illustrating possible example details associated with the chemical modification of lignin and lignin derivatives;

FIG. 11 is a simplified graph illustrating possible example details associated with the chemical modification of lignin and lignin derivatives;

FIG. 12 is a simplified table illustrating possible example details associated with the chemical modification of lignin and lignin derivatives;

FIG. 17 is a simplified table illustrating possible example details associated with the chemical modification of lignin and lignin derivatives;

FIG. 18 is a simplified table illustrating possible example details associated with the chemical modification of lignin and lignin derivatives;

FIG. 19 is a simplified table illustrating possible example details associated with the chemical modification of lignin and lignin derivatives;

FIG. 20 is a simplified table illustrating possible example details associated with the chemical modification of lignin and lignin derivatives FIG. 21 is a simplified table illustrating possible example details associated with the chemical modification of lignin and lignin derivatives;

FIG. 22 is a simplified table illustrating possible example details associated with the chemical modification of lignin and lignin derivatives;

FIG. 23 is a simplified table illustrating possible example details associated with the chemical modification of lignin and lignin derivatives;

FIG. 25 is a simplified table illustrating possible example details associated with the chemical modification of lignin and lignin derivatives;

DETAILED DESCRIPTION OF EXAMPLE EMBODIMENTS

Overview

Figure 1:
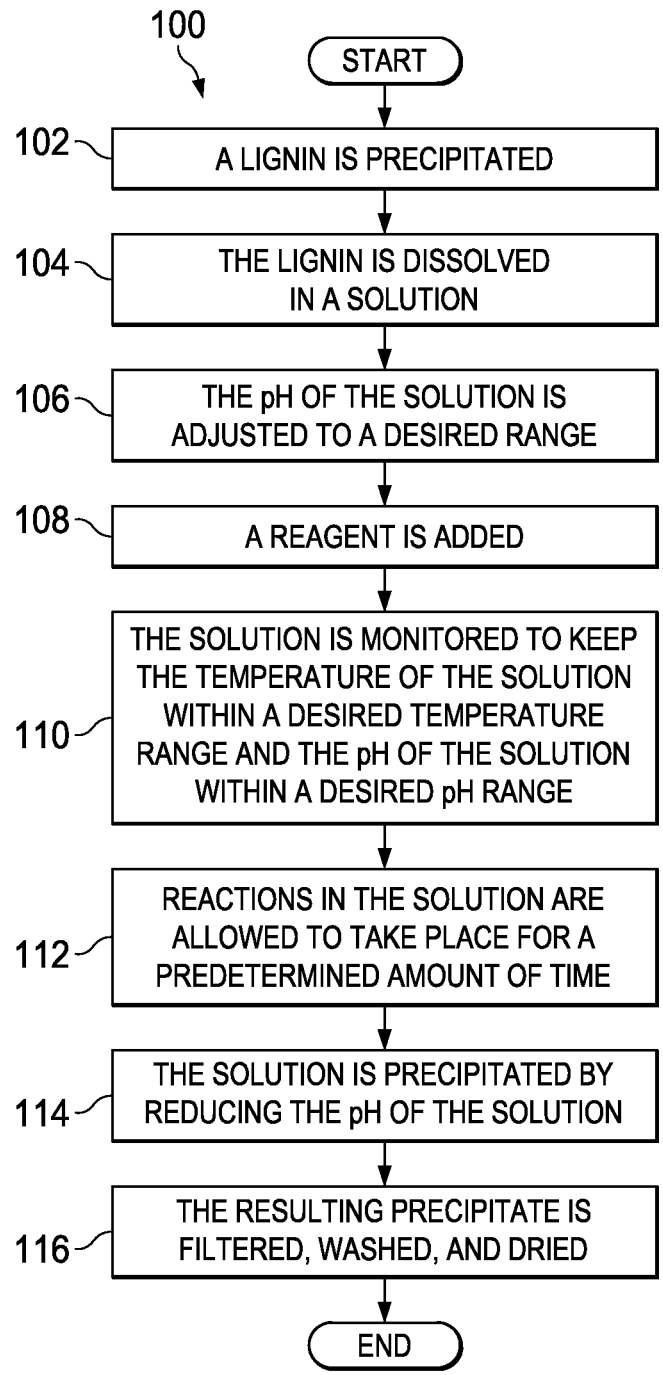
FIG. 1 is a simplified flow diagram illustrating one possible set of activities associated with the chemical modification of lignin and lignin derivatives.

Lignin is a biopolymer, abundant in nature, and is potentially an inexpensive feedstock material, obtainable as a byproduct of the paper and cellulosic ethanol industries and from a variety of low-value agricultural commodities such as grasses and straw. In order for lignin to gain wider utilization as an inexpensive and biodegradable/biorenewable material, blends of lignin with thermoplastics are needed with enhanced mechanical and other useful properties. These enhanced properties should exceed those properties predictable by simple rules of mixing of the corresponding blends. As used herein, the term "thermoplastic" includes a polymer that becomes pliable or moldable above a specific temperature, and returns to a solid state upon cooling. Most thermoplastics have a high molecular weight, where chains associate through intermolecular forces.

Generally, transesterification is the process of exchanging the organic group R" of an ester with the organic group R' of an alcohol. The reaction can be catalyzed by the addition of an acid or base catalyst and can also be accomplished with the help of enzymes (biocatalysts) particularly lipases (E.C.3.1.1.3). For example, in the presence of an acid or base, a lower alcohol may be replaced by a higher alcohol by shifting the equilibrium (e.g., by using large excess of the higher alcohol or by distilling off the lower alcohol). More specifically, as described herein, transesterification can include a method of enhancing the properties of materials that are comprised of lignin and blended with certain thermoplastics by means of a chemical reaction taking place between the two polymer components.

In one example, a trans-esterified product may be comprised of chemically-modified lignin blended with a polyester. For example, transesterification of an acetoxypropyl lignin or a hydroxypropyl lignin may be used to produce a trans-esterified product. In another embodiment, an ester exchange may be used to produce the trans-esterified product. For example, an acetate ester of the lignin is used to swap carboxylic acid groups with the alcohol oligomer units in the polyester chains and vice versa. The effect is to covalently-bond polyester oligomer units (long straight chains) to the lignin while some of the polyester chains would be shortened and terminated with acetate esters. Because the acetoxypropyl lignin has multiple available chemical functional groups, this exchange may happen multiple times.

In an embodiment, chemically-modified lignins may be chosen from hydroxyalkylated lignins (such as hydroxypropylated lignin) and/or acylated lignins (such as an acetate ester) or other lignin derived materials. In such blends of chemically-modified lignins with certain thermoplastics, transesterification may occur with the replacement of one alcohol group in the ester linkage by another alcohol group. Accordingly, a hydroxyalkylated lignin may undergo transesterification with a nearby polyester macromolecule, thereby transferring a segment of the polyester onto the lignin. In addition transesterification (or ester exchange) may occur with an acylated lignin (or acylated and hydroxypropylated lignin). In this instance, an alkyl ester (such as an acetate ester) of the lignin may exchange carboxylic acid groups with an alcohol terminated segment of the polyester chain. The effect may be to covalently-bond long chain polyester segments to the lignin with concomitant changes in bulk properties.

The resulting properties in the trans-esterified lignin/thermoplastic blends can include increased tensile strength, increased modulus, increased compressive strength, decreased coefficient of thermal expansion, retarded biodegradability and other properties. It is important to note that, in order to retain thermoplastic properties, it is desirable to control or limit the extent of transesterification of the lignin/thermoplastic blend such that extensive crosslinking does not occur. Extensive crosslinking would result in a thermoset which may decrease or prevent processibility of the lignin/thermoplastic blend (e.g., processibility into films, fibers or molded articles).

In other embodiments, transesterification may be induced to occur during blending or post-blending by an elevated temperature range, a time period at elevated temperature, and/or the addition of a chemical catalyst. The elevated temperature range for transesterification to occur is chosen from a temperature range above the melting temperature of the thermoplastic component and from a temperature range below the decomposition temperature of the lignin component. An estimated preferred temperature range can be found between about 150° C. and about 250° C., although other ranges could certainly be used in the context of the present disclosure. The preferred time at elevated temperature for transesterification is chosen from a time long enough to cause transesterification to occur while short enough to limit undesirable crosslinking and/or thermal degradation. An estimated preferred time at elevated temperature for transesterification may be found between about 10 minutes and about 48 hours. The chemical catalysts for transesterification may be chosen from alkali carbonates (such as sodium carbonate), zinc acetate, and titanium (IV) butoxide and related compounds. The add-mixture of the transesterification catalyst is estimated to be in the range of 0% to 20% by weight of the material, although other ranges could certainly be used in the context of the present disclosure.

In one example embodiment, the chemical modification of lignin and lignin derivatives may be used for a variety of applications. For example, the chemical modification of lignin and lignin derivatives may be used for film products such as bags (e.g., grocery bags, trash bags, etc.), sheets, liners, agricultural films, packaging, etc.; formed and molded products such as cups and plates, cutlery, bottles etc.; injection molded products such as toys, flower pots, computer cases, automotive parts, etc.; extruded products such as pipes, hoses, tubing, etc., and various other consumer products.

The lignin component biodegrades into humus through an oxidative process by bacteria, fungi, and actinomycetes. Lignin peroxidases, manganese peroxidases, and laccases are enzymes produced by fungi that contribute to the biodegradation of lignin. An aliphatic polyester component is also broken down with exposure to natural enzymes such as lipases. Exposure to the natural elements, such as sun and water, may also expedite the degradation process.

In one example implementation, a thin film structural integrity would likely be compromised within 30 to 60 days of exposure to the natural environment. However, different blends can be created that would enable a structure to last longer. More specifically, poly (lactic acid) or polylactide (PLA) may be added to extend the period of breakdown and thereby extend the life of a product. PLA is a thermoplastic aliphatic polyester derived from renewable resources, such as cornstarch, tapioca products, or sugarcanes. In addition, a thicker film could also enable a structure to last longer.

The chemical modification of lignin and lignin derivatives may be produced using acetyoxypropyl lignin (APL) or hydroxypropyl lignin (HPL) trans-esterified with aliphatic polyesters or aliphatic-aromatic copolymers, or homogenous blends of APL with a biodegradable polymer. The aliphatic polyesters can include polybutylene succinate (PBS), polycaprolactone (PCL), poly lactic acid (PLA), polyhydroxyalkanoate (PHA), aliphatic-aromatic copolymers (AAC), etc. In addition aliphatic-aromatic copolymers (AAC) may also be trans-esterified with APL or HPL. A sustainable resin may be produced using HPL or APL blended with another polymer (nonbiodegradable). The aromatic polyesters can be a modified polyethylene terephthalate (PET), polybutylene adipate/terephthalate (PBAT), etc.

the range of 1% to 99%, the polyester in the range of 1% to 99%, and the one or more additives in the range of 0% to 50% (where the total percentage of the HPL, the polyester, and the one or more additives combined is equal to 100%). Further, the trans-esterified HPL can be represented by the formula R'COOR, wherein R' represents the HPL and R represents the polyester. In addition, an acetate ester of the HPL may be used to swap carboxylic acid groups with the alcohol oligomer units in the polyester chains.

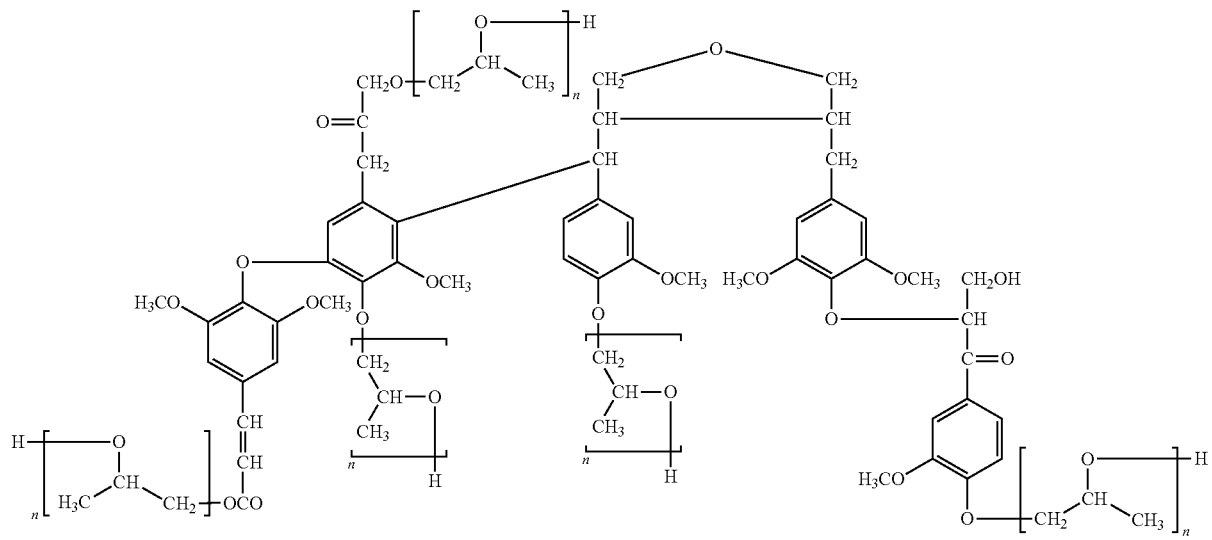

Hydroxypropyl Lignin(HPL)
Where n=1
Acetoxypropyl Lignin (APL)
Where all OH— groups are replaced by —OAcetyl (CO—CH$_3$) groups HPL Overview In one example implementation, a trans-esterified HPL can include a HPL and a polyester including polyester chains. The polyester may be an aliphatic polyester, a semi-aromatic polyester, or an aromatic polyester. In other examples, an acetate ester of the HPL can be used to swap carboxylic acid groups with the alcohol oligomer units in the polyester chains. In one implementation, polyester oligomer units are covalently-bonded to the HPL while one or more of the polyester chains are shortened and terminated with acetate esters. Further, the trans-esterified HPL can be represented by the formula R'COOR, wherein R' represents the HPL and R represents the polyester. In addition, transesterification may occur with the replacement of one alcohol group in the ester by another different alcohol group.

In another example implementation, a trans-esterified HPL blend can include a HPL, a polyester including polyester chains, and one or more additives. The one or more additives can be selected from the group consisting of catalysts, compatibilizers, odor neutralizers, fragrances, and process aids. The trans-esterified HPL blend may further include a plasticizer. The plasticizer can reduce a glass transition temperature of the trans-esterified HPL. (The term "glass transition temperature" (or glass-liquid transition temperature) is the temperature at which an amorphous material (or in amorphous regions within semicrystalline materials) enters a reversible transition from a hard and relatively brittle state into a molten or rubber-like state.) In one implementation, the trans-esterified HPL blend comprises by weight: the HPL in In another example implementation, a non-trans-esterified HPL blend can include a HPL, a non-trans-esterified polymer, and one or more additives. The term "polymer" includes natural or synthetic molecules made up of chains or rings of linked monomer units. For example, polyolefins (made from olefin (alkene) monomers), polyesters, amides, urethanes, acrylics, etc. (monomers linked by ester, amide, urethane, acrylate, or other functional groups), natural polymers (e.g., polysaccharides, protein, DNA, etc.), etc. The one or more additives can be selected from the group consisting of catalysts, compatibilizers, odor neutralizers, fragrances, and process aids. The non-trans-esterified HPL blend may further include a plasticizer. The plasticizer can reduces a glass transition temperature of the non-trans-esterified HPL. In one implementation, the non-trans-esterified HPL blend comprises by weight: the HPL in the range of 1% to 99%, the non-trans-esterified polymer in the range of 1% to 99%, and the one or more additives in the range of 0% to 50% (where the total percentage of the HPL, the non-trans-esterified polymer, and the one or more additives combined is equal to 100%). In another implementation, the non-trans-esterified HPL blend comprises by weight: the HPL in the range of 1% to 99%, the non-trans-esterified polymer in the range of 1% to 99%, the one or more additives in the range of 0% to 50%, and a plasticizer in the range of about 0% to about 50% (where the total percentage of the HPL, the non-trans-esterified polymer, the one or more additives, and the plasticizer combined is equal to 100%). In addition, the non-trans-esterified polymer may be selected from the group consisting of polyolefins, polyesters, amides, urethanes, acrylics, and polysaccharides.

A method for producing a HPL is provided in one example embodiment and includes precipitating a lignin, dissolving the precipitated lignin in a solution, adding a reagent to the solution, adjusting the pH of the solution, allowing reactions in the solution to occur for a predetermined amount of time, precipitating the solution to produce a precipitate, and washing, filtering, and drying the precipitate to produce the trans-esterified HPL. The HPL may be a Kraft lignin precipitated by a Lignoboost process. In one example, the lignin may be dissolved in a sodium hydroxide solution. Further, the sodium hydroxide solution can be about 4% to about 6% sodium hydroxide. Also, the pH of the solution may be adjusted to a range of about 11.5 pH to about 12.5 pH. In more particular embodiments, the reagent is propylene oxide. In addition, a total weight of the propylene oxide added to the solution may be about half a total weight of the precipitated lignin in the solution. In a specific implementation, the solution may be precipitated by reducing the pH to below about 2.5 pH. The method may further include adding sulfuric acid to reduce the pH.

In an example implementation, trans-esterified lignin/thermoplastic blend can include a trans-esterified HPL and a thermoplastic. The trans-esterified HPL can be created by precipitating a lignin, dissolving the precipitated lignin in a solution, adding a reagent to the solution, adjusting the pH of the solution, allowing reactions in the solution to occur for a predetermined amount of time, precipitating the solution to produce a precipitate, and washing, filtering, and drying the precipitate to produce the trans-esterified HPL. The HPL may be a Kraft lignin precipitated by a Lignoboost process. In one example, the lignin can be dissolved in a sodium hydroxide solution and the sodium hydroxide solution may be about 4% to about 6% sodium hydroxide. Further, the reagent can be propylene oxide and a total weight of the propylene oxide added to the solution may be about half a total weight of the precipitated lignin in the solution. In a specific example, the solution can be precipitated by adding sulfuric acid to reduce the pH to below about 2.5 pH.

A method for producing a biodegradable plastic is provided in one example embodiment and includes extruding a trans-esterified lignin/thermoplastic blend, the trans-esterified lignin/thermoplastic blend including a trans-esterified HPL and a thermoplastic. The trans-esterified HPL can be created by precipitating a lignin, dissolving the precipitated lignin in a solution, adding a reagent to the solution, adjusting the pH of the solution, allowing reactions in the solution to occur for a predetermined amount of time, precipitating the solution to produce a precipitate, and, washing, filtering, and drying the precipitate to produce the trans-esterified HPL. In one example, an alkyl ester of the HPL exchanges carboxylic acid groups with an alcohol terminated segment of a polyester chain such that long chain polyester segments can be covalently-bond to the HPL. In one particular implementation, the extent of transesterification of the lignin/thermoplastic blend can be controlled such that extensive crosslinking does not occur in order to retain thermoplastic properties. Also, the biodegradable plastic may be a film product, a formed and molded product, an injection molded product, or an extruded product that biodegrades over a period of time into humus through an oxidative process. In addition, polylactide may be added to the lignin/thermoplastic blend to extend the period of time that the biodegradable plastic biodegrades.

APL Overview

In one example implementation, a trans-esterified APL can include an APL and a polyester including polyester chains. The polyester may be an aliphatic polyester, a semi-aromatic polyester, or an aromatic polyester. In other examples, an acetate ester of the APL can be used to swap carboxylic acid groups with the alcohol oligomer units in the polyester chains. In one implementation, polyester oligomer units are covalently-bonded to the APL while one or more of the polyester chains are shortened and terminated with acetate esters. Further, the trans-esterified APL can be represented by the formula R'COOR, wherein R' represents the APL and R represents the polyester. In addition, transesterification may occur with the replacement of one alcohol group in the ester by another different alcohol group.

In another example implementation, a trans-esterified APL blend can include a APL, a polyester including polyester chains, and one or more additives. The one or more additives can be selected from the group consisting of catalysts, compatibilizers, odor neutralizers, fragrances, and process aids. The trans-esterified APL blend may further include a plasticizer. The plasticizer can reduce a glass transition temperature of the trans-esterified APL. In one implementation, the trans-esterified APL blend comprises by weight: the APL in the range of 1% to 99%, the polyester in the range of 1% to 99%, and the one or more additives in the range of 0% to 50% (where the total percentage of the APL, the polyester, and the one or more additives combined is equal to 100%). Further, the trans-esterified APL can be represented by the formula R'COOR, wherein R' represents the APL and R represents the polyester. In addition, an alkyl ester of the APL may be used to swap carboxylic acid groups with the alcohol terminated segment in the polyester chains.

In another example implementation, a non-trans-esterified APL blend can include an APL, a non-trans-esterified polymer, and one or more additives. The one or more additives can be selected from the group consisting of catalysts (e.g., zinc acetate, titanium butoxide, etc.), compatibilizers (e.g., maleaic anhydride, etc.), odor neutralizers (e.g., ADDISPERSE® odor neutralizer concentrate, etc.), fragrances (e.g., FRENCH FRAGRANCES™ apple, FRENCH FRAGRANCES™ french toast, FRENCH FRAGRANCES™ mandarin, etc.), and process aids (e.g, slip, erucamide, oleamide, antiblock, calcium carbonate, silica, talc etc.). The non-trans-esterified APL blend may further include a plasticizer (e.g., biodegradable such as alkyl citrates, acetyl tributyl cirtrate (ATBC), acetyl triethyl cirtrate, acetylated monoglycerides, etc. or non-biodegradable such as phthalates, diisooctyl phthalate (DIOP), glycols, etc.). The plasticizer can reduce a glass transition temperature of the non-trans-esterified APL. In one implementation, the non-trans-esterified APL blend comprises by weight: the APL in the range of 1% to 99%, the non-trans-esterified polymer in the range of 1% to 99%, and the one or more additives in the range of 0% to 50% (where the total percentage of the APL, the non-trans-esterified polymer, and the one or more additives combined is equal to 100%). In another implementation, the non-trans-esterified APL blend comprises by weight: the APL in the range of 1% to 99%, the non-trans-esterified polymer in the range of 1% to 99%, the one or more additives in the range of 0% to 50%, and a plasticizer in the range of about 0% to about 50% (where the total percentage of the APL, the non-trans-esterified polymer, the one or more additives, and the plasticizer combined is equal to 100%). In addition, the non-trans-esterified polymer may be selected from the group consisting of polyolefins, polyesters, amides, urethanes, acrylics and polysaccharides.

A method for producing an APL is provided in one example embodiment and includes mixing a solvent, a catalyst, a reagent, and a HPL to create a solution, raising the temperature of the solution to a first reaction temperature, raising the temperature of the solution to a second reaction temperature, allowing reactions in the solution to occur for a predetermined amount of time, precipitating the solution to produce a precipitate, and washing, filtering, and drying the precipitate to produce the APL. The HPL can contain about three percent moisture. In an example, the solvent is a fifty percent acetic acid solution. Also, the catalyst may be sodium acetate. Further, the reagent may be a fifty percent acetic anhydride solution. In one implementation, the method may further include dissolving the catalyst in the solvent to create a solvent catalyst solution, where the catalyst may be sodium acetate and the solvent can be a fifty percent acetic acid solution, adding the HPL to the solvent catalyst solution, and adding the reagent to the solvent catalyst solution that contains the HPL, where the reagent may be a fifty percent acetic anhydride solution. In addition, the amount of HPL added to the solvent catalyst solution can be about thirty percent of a total weight of the solvent catalyst solution. In a specific example, the solution can be precipitated by adding a volume of the solution into a volume of ice water. The volume of the ice water may be five times the volume of the solution. The precipitate can be dried in auntil the precipitate contains about three percent moisture. In one example, the precipitate is dried in a convection oven.

In another example implementation, a trans-esterified lignin/thermoplastic blend can include a trans-esterified lignin and a thermoplastic. The trans-esterified lignin can be an APL created by adding a solvent, a catalyst, and a reagent to a HPL, raising the temperature of the solution to a first reaction temperature, raising the temperature of the solution to a second reaction temperature, allowing the reactions in the solution to occur for a predetermined amount of time, precipitating the solution to produce a precipitate, and washing, filtering, and drying the precipitate to produce the APL. In an example, the solvent may be a 50% acetic acid solution, the catalyst may be sodium acetate, and the reagent may be a 50% acetic anhydride solution. In one implementation, the catalyst can be dissolved in the solvent to create a solvent catalyst solution, where the catalyst may be sodium acetate and the solvent can be a 50% acetic acid solution. The HPL may be added to the solvent catalyst solution and the reagent can be added to the solvent catalyst solution that contains the HPL. The reagent may be a 50% acetic anhydride solution. In addition, the solution may be precipitated by adding a volume of the solution into a volume of ice water. The volume of the ice water may be five times the volume of the solution. The precipitate can be dried until the precipitate contains about 3% moisture. In one example, the precipitate is dried in a convection oven.

A method for producing a biodegradable plastic is provided in one example embodiment and includes extruding a trans-esterified lignin/thermoplastic blend, the trans-esterified lignin/thermoplastic blend including a trans-esterified APL and a thermoplastic. The trans-esterified APL can be created by adding a solvent, a catalyst, and a reagent to a HPL, raising the temperature of the solution to a first reaction temperature, raising the temperature of the solution to a second reaction temperature, allowing the reactions in the solution to occur for a predetermined amount of time, precipitating the solution to produce a precipitate, and washing, filtering, and drying the precipitate to produce the APL. In one example, an alkyl ester of the HPL exchanges carboxylic acid groups with an alcohol terminated segment of a polyester chain such that long chain polyester segments can be covalently-bond to the HPL. In one particular implementation, the extent of transesterification of the lignin/thermoplastic blend can be controlled such that extensive crosslinking does not occur in order to retain thermoplastic properties. Also, the biodegradable plastic may be a film product, a formed and molded product, an injection molded product, or an extruded product that biodegrades over a period of time into humus through an oxidative process. In addition, poly-lactide may be added to the lignin/thermoplastic blend to extend the period of time that the biodegradable plastic biodegrades.

EXAMPLE EMBODIMENTS

Turning to FIG. 1, FIG. 1 is a simplified flowchart 100 illustrating example activities associated with the chemical modification of lignin and lignin derivatives. At 102, a lignin is precipitated. For example, a Kraft lignin may be precipitated using a Lignoboost process or some other lignin precipitation process. At 104, the lignin is dissolved in a solution. For example, the lignin may be dissolved in a sodium hydroxide (NaOH) solution. The solution should contain sufficient NaOH to convert the lignin into lignate by neutralizing the available acidic groups (such as phenolic and carboxylic functionalities) and raising the pH of the solution to greater than 8 pH. In one example, the NaOH solution may be about 4% to about 6% NaOH. At 106, the pH of the solution is adjusted to a desired range. For example, the desired range may be between about 10.0 pH to about a 12.5 pH. At 108, a reagent is added. In one example, the reagent is propylene oxide ($CH_3CHCH_2O$). More specifically a one to two ratio (1:2) of propylene oxide per lignin may be used (e.g., about fifty pounds (50 lbs) of propylene oxide to about one hundred pounds (100 lbs) of lignin).

At 110, the solution is monitored to keep the temperature of the solution within a desired temperature range and the pH of the solution within a desired pH range. For example, the solution may be monitored for about four (4) to about six (6) hours to keep the temperature range between about 15° C. and about 25° C. (to make sure the propylene oxide does not flash off) and the pH between about 10.0 pH and about 12.5 pH to facilitate the reaction. Diluted sulfuric acid ($H_2SO_4$) may be used to control the pH. At 112, reactions in the solution are allowed to take place for a predetermined amount of time. For example, the solution may sit for twelve (12) hours to allow the reactions to complete or almost complete. At 114, the solution is precipitated by reducing the pH of the solution. For example, concentrated $H_2SO_4$ may be added to reduce the pH below about pH 2.5 to trigger the precipitation of the modified lignin. At 116, the resulting precipitate is filtered, washed, and dried. For example, the precipitate may be pumped into a filter press and washed with deionized water ($H_2O$). The precipitate may then be placed in a dryer where the drying temperature can be between about 40° C. to about 100° C. or higher. The dryer may contain one or more agitators to help facilitate drying. In addition, vacuum may be applied to help facilitate the drying. The chemically modified lignin may be removed when the moisture of the chemically modified lignin is below about 3%. In one example, the above described process may be done under atmospheric conditions with an inert gas (e.g., argon or nitrogen) pad.

It should be noted that the modification of the lignin (as described herein) can take place entirely in an aqueous solution. In addition, the temperature and pH are controlled during the process. This allows for larger batches of HPL to be produced, the usage of propylene oxide to be enhanced, reduction in propylene glycol produced, and improved filtering. The processes described herein allows for a consistently produceable, filterable HPL product, on a relatively large scale.

Figure 2:
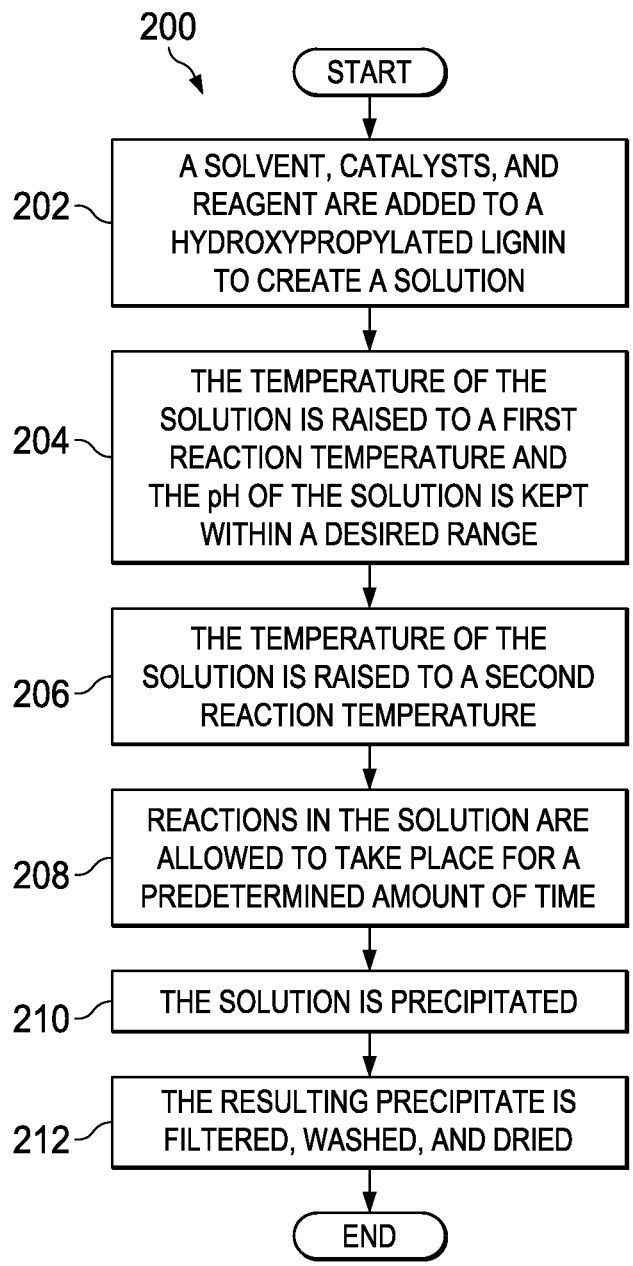
FIG. 2 is a simplified flow diagram illustrating one possible set of activities associated with the chemical modification of lignin and lignin derivatives.

Turning to FIG. 2, FIG. 2 is a simplified flowchart 200 illustrating example activities associated with the chemical modification of lignin and lignin derivatives. At 202, a solvent, catalysts, and reagent are added to a hydroxypropylated lignin (HPL) to create a solution. For example, about 50% acetic acid may be used as the solvent, sodium acetate may be used as the catalyst, and 50% acetic anhydride may be used as the reagent. In one example, the HPL is dried to about 3% moisture. While the order of adding the solvent, catalyst, reagent, and HPL does not affect the process, in one implementation, the catalyst is first dissolved in the solvent. Then the lignin is added where the amount of lignin added is about 30% of the total weight of the solution (i.e., the catalyst and the solvent). Next, the reagent is added to the solution.

At 204, the temperature of the solution is raised to a first reaction temperature and the pH of the solution is kept within a desired range. For example, the temperature of the solution may be raised to a first reaction temperature of about 50° C. and the desired range of pH can be in the acidic range (e.g., a pH of 2 or 3). At 206, the temperature of the solution is raised to a second reaction temperature. For example, the second reaction temperature may be about 70° C. At 208, reactions in the solution are allowed to take place for a predetermined amount of time. For example, the solution may sit for twelve (12) hours to allow the reactions to complete or almost complete.

At 210, the solution is precipitated. For example, the solution may be precipitated by introducing a small stream of the solution into a relatively large volume of ice water. In one implementation, the large volume of ice water is about five (5) times the volume of solution. In an example, the solution is vigorously stirred as the solution enters the ice water to facilitate contact with the ice water and produce a desired precipitation and particle size. At 212, the resulting precipitate is filtered, washed, and dried. For example, the solution may be filtered in a Büchner funnel or some other similar type filter. The precipitate may be washed (in one example at least two times) with deionized water to wash out impurities such as acetic acid. The washed precipitate may be dried in a convection oven until the moisture of the precipitate is about 3% moisture or less.

The disclosed modified lignin and lignin derivatives may be blended with a thermoplastic to produce a trans-esterified lignin/thermoplastic blend. The extrusion is done at a temperature that will not degrade the modified lignin (e.g., in a temperature range of about 110° C. to about 180° C.). In an example, the extrusion rate (dwell time in the extruder) is at least ten (10) minutes but less than sixty (60) minutes to ensure no degradation of the modified lignin occurs during extrusion processing. The trans-esterified lignin/thermoplastic blend may be used for film products such as bags (e.g., grocery bags, trash bags, etc.), sheets, liners, agricultural films, packaging, etc.; formed and molded products such as cups and plates, cutlery, bottles etc.; injection molded products such as toys, flower pots, computer cases, automotive parts, etc.; extruded products such as pipes, hoses, tubing, etc., and various other consumer products.

In an illustrative example, various trans-esterified lignin/thermoplastic blends were extruded on a THEYSOHN® TSK 21 mm twin screw extruder. Pellets of the trans-esterified lignin/thermoplastic blends were separately placed in a desiccant dryer overnight prior to blow extrusion. The pellets were blown on a 1.5" single screw extruder with a 2" vertical blown film air die. About 10 pounds each of 30% HPL, 70% aliphatic polyester and 30% HPL, 70% metallocene catalyzed low density polyethylene were cast extruded on a 1.5" single screw extruder with an 8" die with rollers. The modified lignin can be blended with thermoplastics such as polypropylene (PP), low density polyethylene (LDPE), linear low-density polyethylene (LLDPE), high density polyethylene (HDPE), ethylene vinyl acetate (EVA), ECOVIO®, ECOFLEX®, polyethylene glycol (PEG), poly butylene succinate (PBS), polyethylene terephthalate (PET), polyhydroxyalkanoates (PHAs), polybutyl acrylate (PBA), polylactic acid or polylactide (PLA), etc.

The HPL was placed in fifty-five (55) gallons drums and filtered and washed on a 470 mm filter press. The HPL cakes had a moisture content of about 48%. The cakes were left in open air for about forty-eight (48) hours that reduced the moisture to about 25%. The cakes were then dried on a 40 L Helical dryer to a moisture content of 2.5%. The dry HPL was packaged and shipped for processing.

The pellets were compounded on a THEYSOHN® TSK 21 mm twin screw extruder at PCE. The carrier resin was fed through a hopper, and the HPL powder was side fed about mid-way through the screw. The compounded strand was cooled with two (2) water baths and had an air knife to blow off excess water before being cut into pellets.

Prior to blow extrusion, the pellets were placed in a desiccant dryer overnight to reduce the moisture to below 0.05%. The pellets were blown on a 1.5" single screw extruder with a 2" vertical blown film air die. About 10 pounds of the 30:70 HPL:Eco and HPL:LDM were cast extruded on the 1.5" single screw extruder with an 8" die with rollers. A good temperature range for compounding and converting the HPL is around about 270° F. to about 350° F. The carrier resins that blended best with the HPL had melt temperatures in or below that zone.

Lignin Chemical Modification Reactions

HPL $1^{st}$ Preparation

A 3.0 L 3-necked, round-bottomed flask was assembled with an overhead stirrer and equipped with a Friedrich condenser and a water-jacketed addition funnel. Chilled water was circulated through the condenser and the jacket of the addition funnel. The reactor was charged with a 6 wt % aqueous sodium hydroxide solution (500 mL). The lignin was added in portions until it was completely dissolved in a viscous dark brown mixture. The pH was about 11.0 as indicated by pHYDRION® pH 1-14 indicator paper, slightly dampened with distilled water. To the addition funnel was added 125 g of propylene oxide which was then added dropwise over a period of one hour to the stirred mixture. The reaction was stirred at room temperature for 48 hours. When the reaction was complete, argon was bubbled through the mixture for about 30 min to drive off the excess propylene oxide. With the flask chilled in an ice bath, dilute (about 7%) sulfuric acid was added until the pH of the mixture was about 2.0 (as indicated by pHYDRION® paper, 1-14 pH range). The mixture was allowed to settle overnight and the supernatant was decanted from the precipitate. About 1.0 L of deionized water was added with stirring. The yellow cloudy supernatant suspension was removed by centrifugation. The washing was repeated 2 more times. Then, the brown insoluble material was re-suspended in water and freeze dried to afford 65 g (26% of the original weight) of light brown powder.

HPL $2^{nd}$ Preparation

A 3-necked 12 L round-bottomed flask with a bottom stopcock, was assembled with 5 ft. of ⅜ id polyethylene internal cooling coils, a Friedrich condenser, a 100 mL jacketed addition funnel and an overhead stirrer connected by a flexible mechanical cable to a variable speed stir motor.

The internal coils were connected to a re-circulating heater/chiller. The Friedrich condenser and jacketed addition funnel were connected to each other in series and to a second re-circulating heater/chiller. Into the 12 L flask was placed a solution of 60 g of sodium hydroxide in 4.0 L of deionized water. The pH of the solution was then adjusted to a pH of 11.5 (as indicated by pHYDRION® paper, 9 to 13 pH range) by the careful addition of 10% hydrochloric acid, thus increasing the solution volume to about 4.4 L. The solution was cooled by circulating chilled (20° C.) coolant (ethylene glycol/water) through the internal coils. A lignin powder isolated from a spent alkaline pulping liquor (1.3 kg) was then added in small portions through a large long stem funnel while the solution was vigorously stirred. When all of the lignin had been added, the pH was then readjusted to a pH of 11.0. The Friedrich condenser and the addition funnel were cooled by circulating chilled (0° C.) coolant (ethylene glycol/water). A one-holed stopper was placed in the top of the addition funnel and the stem of a separatory funnel, supported by a ring, was placed through the hole. (Thus the liquid from the separatory funnel could replenish the liquid in the addition funnel as it was dispensed dropwise into the reaction mixture.)

To the separatory funnel and jacketed addition funnel were added 500 mL of propylene oxide (SIGMA-ALDRICH® Chemical Co, previously chilled overnight in a refrigerator). The cold propylene oxide was added dropwise over a period of about 2 hours to the stirred reaction mixture. Stirring of the mixture was continued overnight at 20° C. under a 0° C. cooled reflux condenser. The next day, the pH of the mixture was again adjusted to pH 11.0 (as indicated by pHYDRION® paper in the 9 to 13 pH range) by the addition of 10% hydrochloric acid and stirring was continued for an additional 24 hours (48 hours total), at 25° C. At the conclusion of the reaction, the reflux (Friedrich) condenser was removed and the temperature of the internal coils was increased to 45° C. as a vigorous stream of argon (>5 L min) was passed over the reaction mixture for 30 min to drive off any un-reacted propylene oxide.

The reaction mixture was then drained through the bottom stopcock port into a 20 L polyethylene bucket (precipitation tank). An overhead stirrer with a large paddle was used to vigorously stir the mixture in the bucket as dilute, room-temperature sulfuric acid (about 150 mL in 150 mL of distilled water) was added in portions until a pH of 2.0 (as indicated by pHYDRION® 1-14 paper) was achieved. When the acidification was complete, the initially dark brown solution had become a lighter brown suspension as lignin precipitated.

The modified lignin was separated from the supernatant in about 1.0 L portions by filling four 250 mL polyethylene bottles with the brown suspension, balancing the opposing bottles, and centrifuging at 4000 rpm for 30 min. Brown solid pellets were collected in eight bottles. The contents of each bottle were washed with 3×200 mL of water by re-suspending the pellets in distilled water and re-centrifuging. The collected solid was divided into two halves (4 bottles per half). Each half was re-suspended in about 1 L of water, filtered through a stainless steel mesh to remove lumps and freeze dried (−86° C. condenser, 0.007 torr, 48 h, until 299 g (23% of the starting weight) of a fine light brown powder was obtained.

HPL $3^{rd}$ Preparation

A concentration of sodium hydroxide was reduced to 5% and diluted 4N sulfuric acid was used for pH control. (In the precipitation stage concentrated sulfuric acid was used.) A 100 gal Ross mixer was equipped with an anchor agitator and a dispersing agitator.

Figures 3, 4:
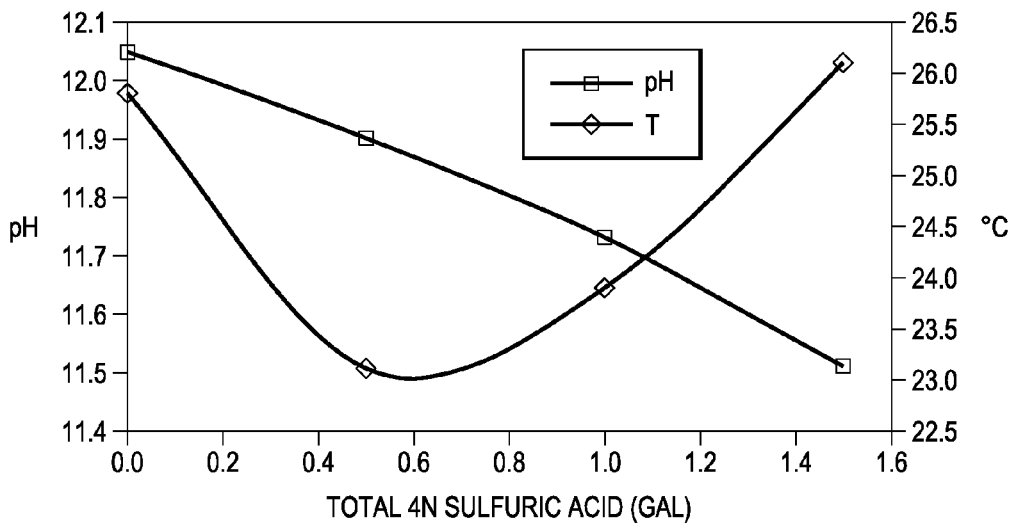
FIG. 3 is a simplified table illustrating possible example details associated with the chemical modification of lignin and lignin derivatives.
FIG. 4 is a simplified graph illustrating possible example details associated with the chemical modification of lignin and lignin derivatives.

Sodium hydroxide pellets were added to ice cold water in the Ross mixer prior to the addition of lignin. Once all the sodium hydroxide pellets were dissolved, the lignin was added in 20 to 23 lb-portions at a time over a period of about one and a half hours. FIG. 3 illustrates possible example details associated with the addition over lignin over time.

Once all the lignin had dissolved, the pH of the solution was adjusted down to a pH of 11.5 with the addition of 4N sulfuric acid. FIG. 4 illustrates possible example details associated with the pH adjustment over time.

After the pH was adjusted, propylene oxide (PO) was added. The PO was added over a period of an hour and a half. As illustrated in FIG. 5, the pH was monitored throughout the addition and adjusted as necessary with 4N sulfuric acid.

Figures 7, 8:
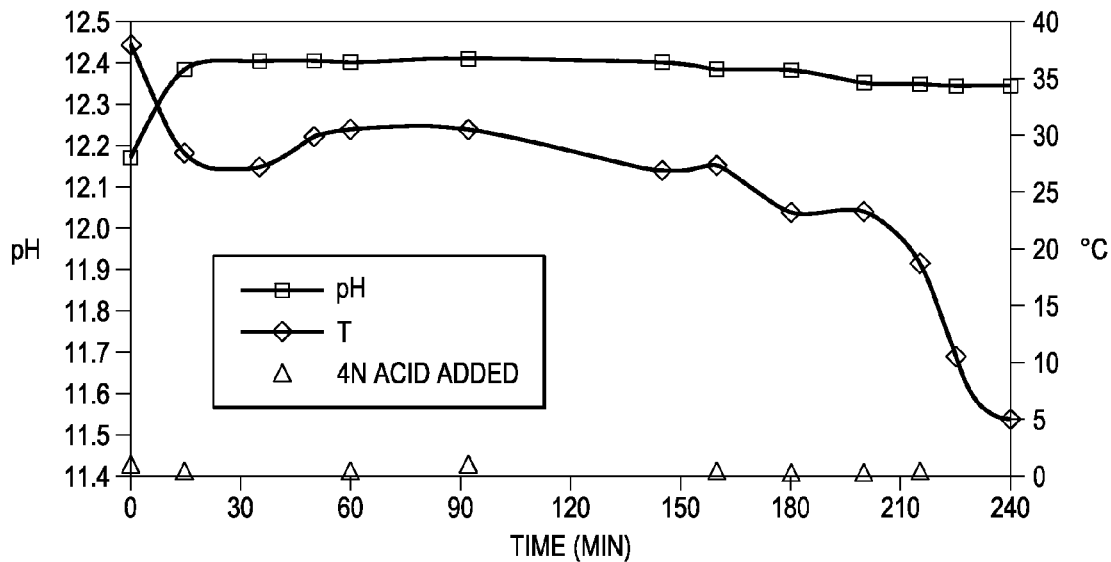
FIG. 7 is a simplified graph illustrating possible example details associated with the chemical modification of lignin and lignin derivatives.
FIG. 8 is a simplified table illustrating possible example details associated with the chemical modification of lignin and lignin derivatives.

The reaction was allowed to run overnight. As illustrated in FIG. 6, during the first 4 hours of the reaction, the pH was monitored and adjusted as necessary with 4N sulfuric acid. FIG. 7 illustrates possible example details associated with the pH adjustment over time.

Figures 9, 10:
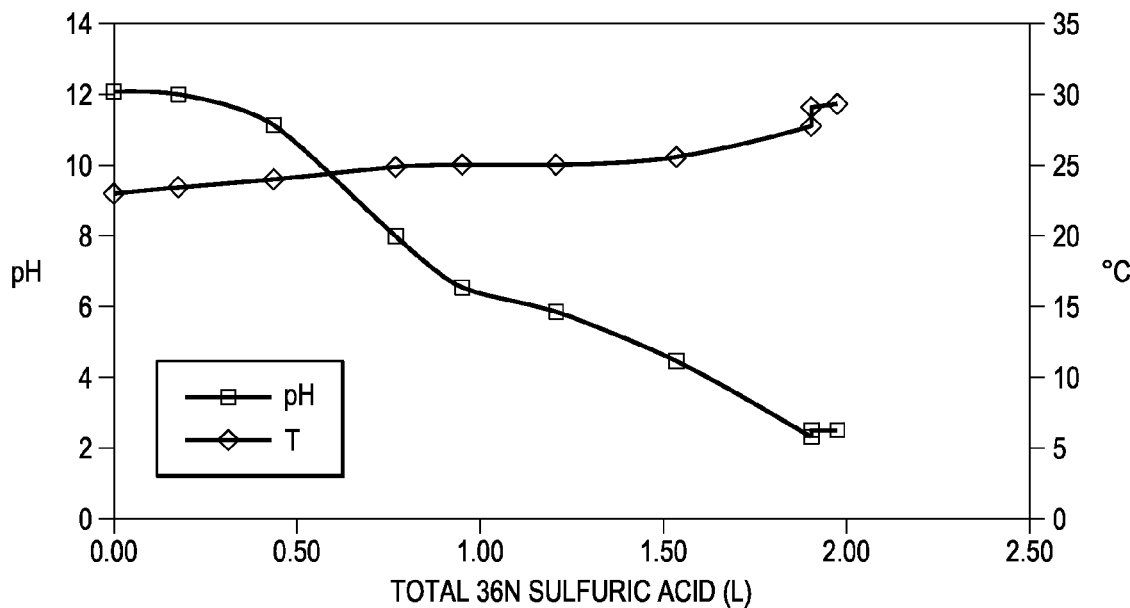
FIG. 9 is a simplified graph illustrating possible example details associated with the chemical modification of lignin and lignin derivatives.
FIG. 10 is a simplified table illustrating possible example details associated with the chemical modification of lignin and lignin derivatives.

After allowing the reaction to sit overnight, the product was precipitated by adding concentrated sulfuric acid to lower the pH to below 2.5. The sulfuric acid was added over a period of two and a half hours, as illustrated in FIG. 8. FIG. 9 illustrates possible example details associated with the pH adjustment over time.

The mixture was placed in drums and sent to ANDRITZ® in Florence, Ky. for filtering and drying. Filtering was performed via a filter press. Cakes were formed in the filter press and washed by pumping water through the cakes while still in the filter press. A helical dryer was used. However, it was not able to dry the cakes straight from the filter press. The cakes had to be crumbled and spread out to air dry. Once the cakes air dried to about 25% moisture, the helical dryer was able to dry the product to less than 3% moisture.

The lignin had contaminants ranging from straw to rocks which did not help the reaction and also caused a failure of the transfer pump used to pump the product from the Ross mixer to 55 gallon drums. Careful monitoring and control of temperature can result in a consistent product. Nuclear magnetic resonance (NMR) showed that there was a complete reaction of the Kraft lignin to HPL.

HPL $4^{th}$ Preparation

A concentration of sodium hydroxide was reduced to 5% and diluted 4N sulfuric acid was used for pH control. (For the precipitation stage, concentrated sulfuric acid was used.) Ice (or ice bath) was used to control temperature during the reaction. The lignin was sifted prior to being added to the sodium hydroxide solution. A 100 gal Ross mixer was equipped with an anchor agitator and a dispersing agitator.

Sodium hydroxide pellets were added to ice cold water in the Ross mixer prior to the addition of lignin. Once all the sodium hydroxide pellets were dissolved, the lignin was added over a period of about one hour and fifteen minutes. FIG. 10 illustrates possible example details associated with the addition of lignin over time.

Once all the lignin had dissolved, the pH of the solution was adjusted down to a pH of 11.5 with the addition of 4N sulfuric acid. FIG. 11 illustrates possible example details associated with the pH adjustment over time.

After the pH was adjusted, propylene oxide (PO) was added through a port at the top of the Ross mixer. As illustrated in FIG. 12, the PO was added over a period of an hour and twenty minutes. The pH was monitored throughout the addition and adjusted as necessary with 4N sulfuric acid.

Figures 13, 14:
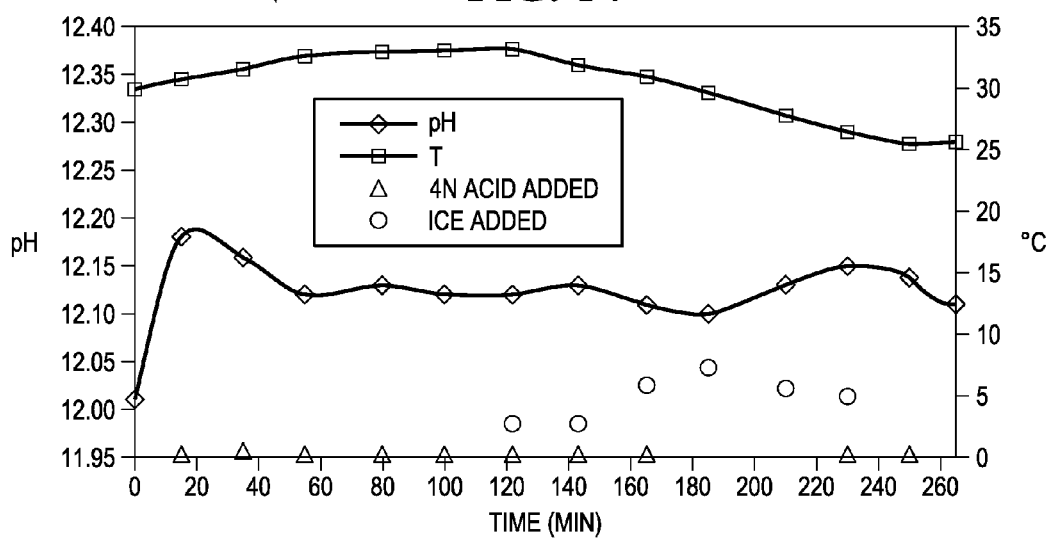
FIG. 13 is a simplified table illustrating possible example details associated with the chemical modification of lignin and lignin derivatives.
FIG. 14 is a simplified graph illustrating possible example details associated with the chemical modification of lignin and lignin derivatives.

The reaction was allowed to run overnight. During the first 4 hours of the reaction the pH was monitored and adjusted as necessary with 4N sulfuric acid. The temperature was also monitored and adjusted by the addition of ice. FIGS. 13 and 14 illustrates possible example details associated with monitoring and adjusting the pH as necessary with 4N sulfuric acid and with monitoring and adjusting the temperature as necessary with ice.

Figures 15, 16:
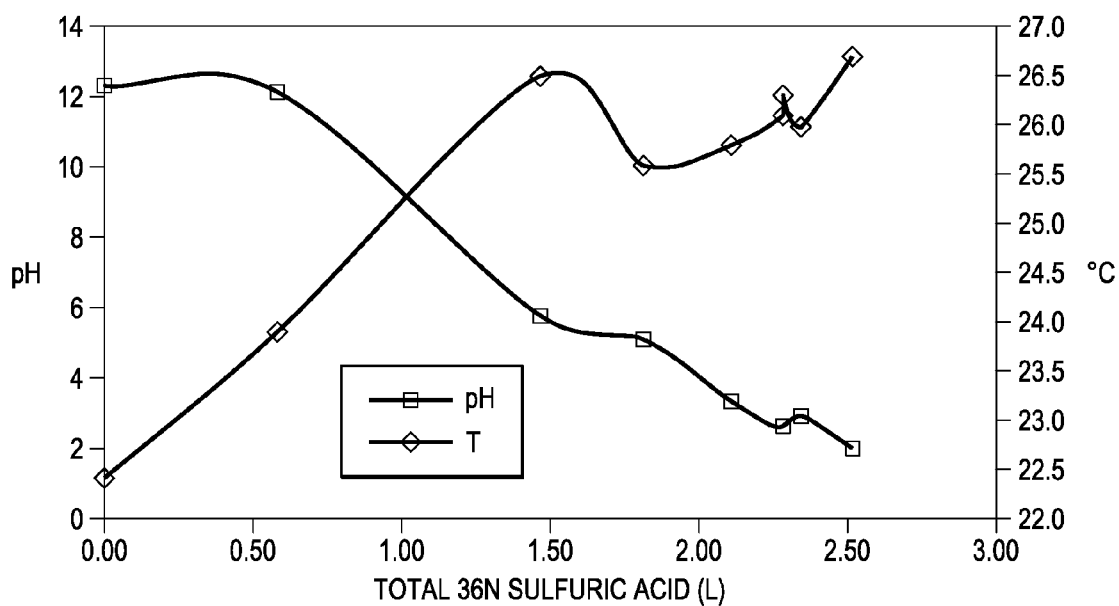
FIG. 15 is a simplified table illustrating possible example details associated with the chemical modification of lignin and lignin derivatives.
FIG. 16 is a simplified graph illustrating possible example details associated with the chemical modification of lignin and lignin derivatives.
Figure 24:
FIG. 24 is a simplified table illustrating possible example details associated with the chemical modification of lignin and lignin derivatives.
Figure 26:
FIG. 26 is a simplified table illustrating possible example details associated with the chemical modification of lignin and lignin derivatives.
Figure 27:
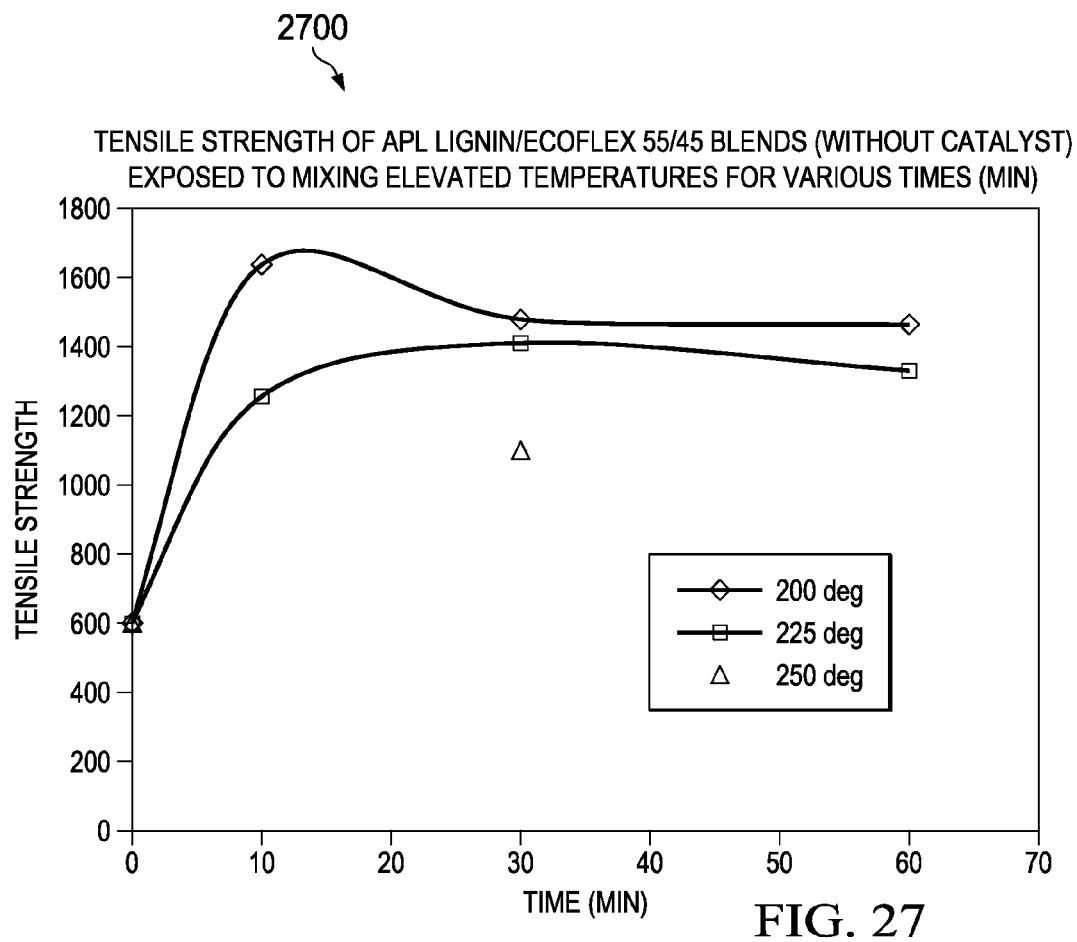
FIG. 27 is a simplified graph illustrating possible example details associated with the chemical modification of lignin and lignin derivatives.
Figure 28:
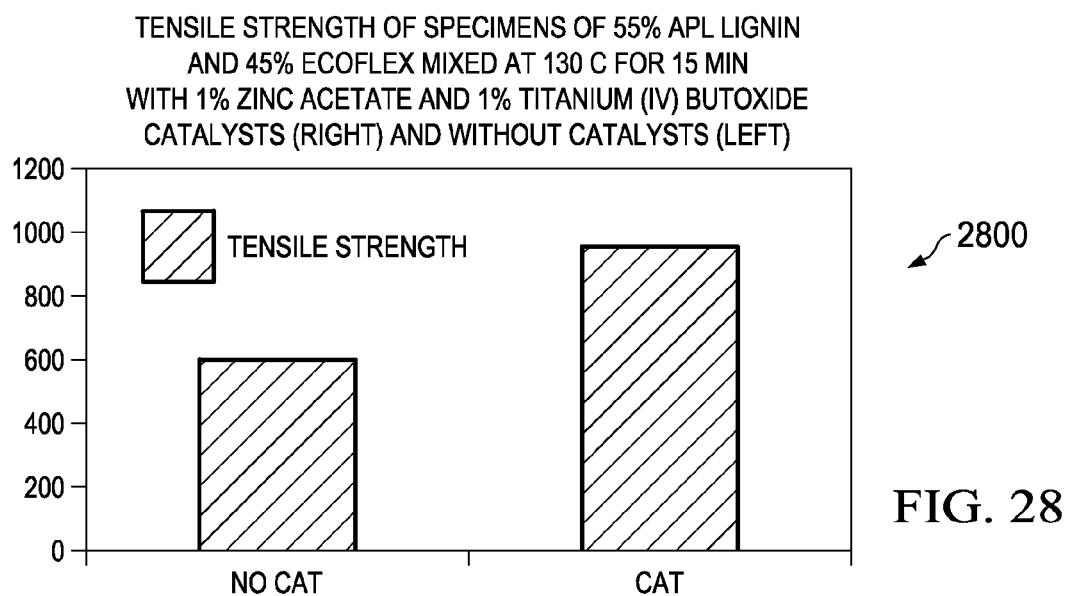
FIG. 28 is a simplified graph illustrating possible example details associated with the chemical modification of lignin and lignin derivatives.

After allowing the reaction to run overnight, the product was precipitated by adding concentrated sulfuric acid to lower the pH to below 2.0, as illustrated in FIG. 16. As illustrated in FIG. 15, the sulfuric acid was added over a period of about 3 hours.

The mixture was placed in drums and sent to ANDRITZ® in Florence, Ky. for filtering and drying. Filtering was performed via a filter press. Cakes were formed in the filtered press and washed by pumping water through the cakes while still in the filter press. The dryer used for this batch was a helical dryer. The helical dryer was not able to dry the cakes straight from the filter press and the cakes had to be crumbled and spread out to air dry. Once the cakes air dried to about 25% moisture the helical was able to dry the product to less than 3% moisture.

Sifting the lignin allowed it dissolve much easier in the alkali solution. Controlling the temperature and pH through the reaction produced a better precipitate and the precipitated particles were larger. NMR showed that there was a complete reaction of the Kraft lignin to HPL.

APL $1^{st}$ Preparation

A 1.0 L, 3-necked flask was equipped with a magnetic stirrer, with a large football-shaped stir bar, and with a tap-water-cooled reflux condenser. In the flask were placed acetic anhydride (100 mL, ~1.0 mol), acetic acid (100 mL) and sodium acetate (8.04 g, ~0.1 mmol). HPL (about 40.0 g) was then added in small portions to the stirred solution until all the lignin had dissolved. The openings in the apparatus were stoppered with rubber septa and then needles, needle-to-tubing adapters, and an oil bubbler were used to establish an argon atmosphere (anhydrous, industrial grade) within the apparatus. The mixture was stirred for 48 hours at room temperature and then refluxed for 1 hour. Upon cooling to room temperature, the mixture was poured into 2.0 L of ice water and the resulting precipitate was collected on a medium porosity sintered glass Buchner funnel, with suction. The collected solid was placed in a glass vessel. The glass vessel with the collected solid was placed in a vacuum oven containing a tray of about 100 g of sodium hydroxide desiccant and then dried in vacuo for 72 hours at 40° C. to produce 39.3 g (98.3% of the starting weight) of dark brown solid particles.

APL $2^{nd}$ Preparation

HPL was dried in a vacuum oven prior to being used and the moisture was tested to be below 3%. Acetic acid was used as the solvent. Acetic anhydride was used as the reagent. Sodium acetate was added as a catalyst.

The apparatus used was a 12 L 3-neck round bottom flask with a bottom stopcock. An overhead stirrer was used to agitate the mixture. An argon pad was used to reduce the amount of acetic anhydride reacting with moisture from the atmosphere.

3.5 L of acetic acid was measured out and added to the 12 L flask. Next the sodium acetate was added to the flask with agitation. Then, 100 g of sodium acetate and the catalyst were added to the acetic acid with agitation. The sodium acetate dissolved after approximately 20 minutes. 1.75 kg of HPL was then added to the flask. After about 30 minutes the HPL had dissolved. Then, 3.5 L of acetic anhydride, the reagent, was added. After all components were added to the solution, the solution was heated to 50° C. This took approximately one hour. The solution was then heated to 70° C. The solution was stirred overnight with heating to ensure complete reaction.

After allowing the reaction to sit overnight, the solution was then cooled to below 50° C. to prepare for precipitation. The APL was then precipitated by opening the stopcock to add a small steady stream of solution to flow into a highly agitated 5-gallon bucket of ice water. The ice water consisted of about 5 kg of ice and 8 kg of water. Half of the solution was precipitated in one bucket of ice water. A second bucket of ice water was used to precipitate the rest of the solution.

The buckets of precipitated APL were poured into a 2-foot diameter Buchner funnel for filtering. The APL formed a porous cake as the filtrate drained through the filter. Water was then added to wash the APL cake while it was in the Buchner funnel. Then, about 2.5 gallons of water was added to the Buchner funnel and allowed to drain. This washing step was repeated 2 to 5 times until the filtrate became clear and the acetic acid odor became less noticeable. The cake was then collected in aluminum pans and placed into a convection oven to dry at 50° C.

Drying the HPL prior to the reaction allowed the use of less acetic anhydride as excess moisture reacts with acetic anhydride turning it into acetic acid. Heating speeds up the reaction. Also, the addition of catalyst speeds up the reaction. APL is less hygroscopic than HPL and dries nicely in a convection oven unlike HPL. The resulting product is friable and crumbles into a fine powder. NMR showed that there was a complete reaction of HPL to APL.

APL and Aliphatic Polyester Blend

Mixtures of APL powder (55% by weight) with Ecoflex™ aliphatic polyester pellets (45% by weight) were dry-blended in amounts to load (about 65 g, according to a mixer manufacturer's formula) a Haake Rheoflex 90 rheometer/mixer. The mixtures and catalyst/additives (if any) are added in portions at slow mixing speeds and then blended in the Haake mixer at 130° C. for about fifteen (15) minutes at about 75 rpm mixing speed and then each batch was removed from the mixer and allowed to cool. Transesterification experiments were conducted by reintroducing approx. 60 g of each batch to the Haake mixer while varying the following conditions:

a. chemical catalyst:
  i. no catalyst
  ii. zinc acetate (1 wt %) and titanium(IV)butoxide (1 wt %)
b. transesterification temperatures
  i. 200° C.
  ii. 225° C.
  iii. 250° C.
c. transesterification times
  i. 10 min.
  ii. 30 min.
  iii. 60 min.

Each batch was removed from the mixer, cooled and analyzed.

Melt compounded samples prepared in Example 1 were hot-pressed into 6 in ×6 in ×0.05 in steel molds using a TETRAHEDRON® Associates, Inc. programmable hot-press and using FREECOAT™ 770-NC mold release. The sheets were pressed at 260° F. at 9000 psi for 15 minutes. Manuel bumping cycles were applied to produce uniform void-free sheets.

"Dog bone" specimens were punched from the sheets using a ASTM D412 die punch and tested according to ASTM D412 testing standards (the term "dog bone" is used as it is known in the art of tensile testing). The results are shown in FIGS. 17-28 below:

The above data indicates that for 55%/45% APL/Ecoflex blends addition heating and blending at around 200° C. for under 30 min can improve tensile strength of the blended material. The data also indicates that for materials blended at 130° C. for 15 minutes, the addition of 1% zinc acetate and 1% titanium (IV) butoxide catalysts can improve the tensile strength of the blends.

It is imperative to note that the operations and steps described with reference to the preceding FIGURES illustrate only some of the possible scenarios that may be executed by, or within, the systems of the present disclosure. Some of these operations may be deleted or removed where appropriate, or these steps may be modified or changed considerably without departing from the scope of the discussed concepts. In addition, the timing of these operations may be altered considerably and still achieve the results taught in this disclosure. The preceding discussions have been offered for purposes of example and discussion. Substantial flexibility is provided by the system in that any suitable arrangements, chronologies, configurations, and timing mechanisms may be provided without departing from the teachings of the discussed concepts. Along similar lines, the ranges (e.g., with respect to timing, temperature, concentrations, etc.) could be varied considerably without departing from the scope of the present disclosure.

Numerous other changes, substitutions, variations, alterations, and modifications may be ascertained to one skilled in the art and it is intended that the present disclosure encompasses all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for producing a trans-esterified hydroxypropyl lignin (HPL), the method comprising:
   precipitating a lignin;
   dissolving the precipitated lignin in a solution;
   adding a reagent to the solution;
   adjusting a pH of the solution;
   allowing reactions in the solution to occur for a predetermined amount of time, wherein the lignin undergoes a transesterification with a nearby polyester macromolecule from a thermoplastic polyester, thereby transferring a segment of the polyester onto the lignin;
   precipitating the solution to produce a precipitate; and
   washing, filtering, and drying the precipitate to produce the trans-esterified HPL, wherein the trans-esterified HPL can be blended with a thermoplastic polyester.

2. The method of claim 1, wherein the HPL is a Kraft lignin precipitated by a Lignoboost process.

3. The method of claim 1, wherein the lignin is dissolved in a sodium hydroxide solution.

4. The method of claim 3, wherein the sodium hydroxide solution is about four percent to about six percent sodium hydroxide.

5. The method of claim 1, wherein the pH of the solution is adjusted to a range of about 11.5 pH to about 12.5 pH.

6. The method of claim 1, wherein the reagent is propylene oxide.

7. The method of claim 6, wherein a total weight of the propylene oxide added to the solution is about half a total weight of the precipitated lignin in the solution.

8. The method of claim 1, wherein the solution is precipitated by reducing the pH to below about 2.5 pH.

9. The method of claim 8, further comprising:
   adding sulfuric acid to reduce the pH.

* * * * *